A. W. WAERN & C. VON PHILP.
MACHINE FOR CUTTING ROUND AND OVAL HOLES.
APPLICATION FILED SEPT. 9, 1908.

934,863.

Patented Sept. 21, 1909.
5 SHEETS—SHEET 1.

WITNESSES

INVENTORS

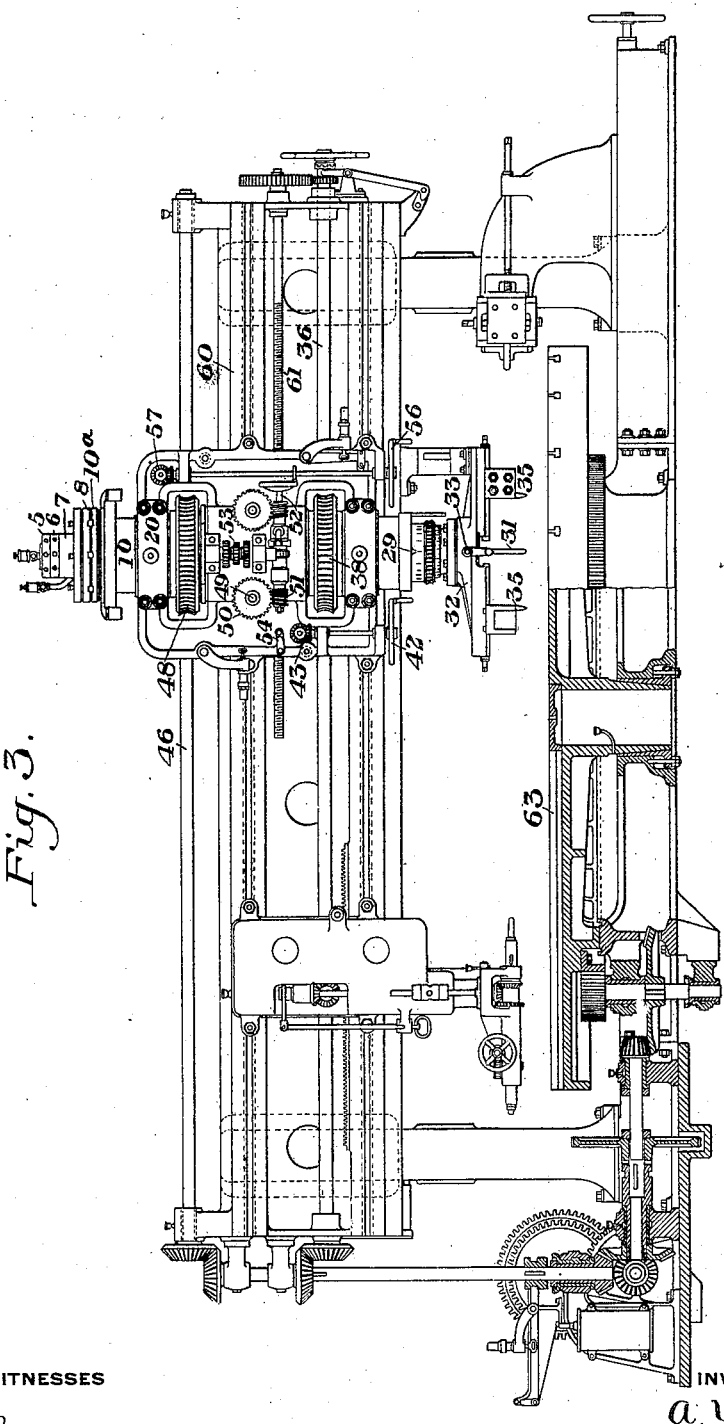

A. W. WAERN & C. VON PHILP.
MACHINE FOR CUTTING ROUND AND OVAL HOLES.
APPLICATION FILED SEPT. 9, 1908.
934,863.
Patented Sept. 21, 1909.
5 SHEETS—SHEET 3.
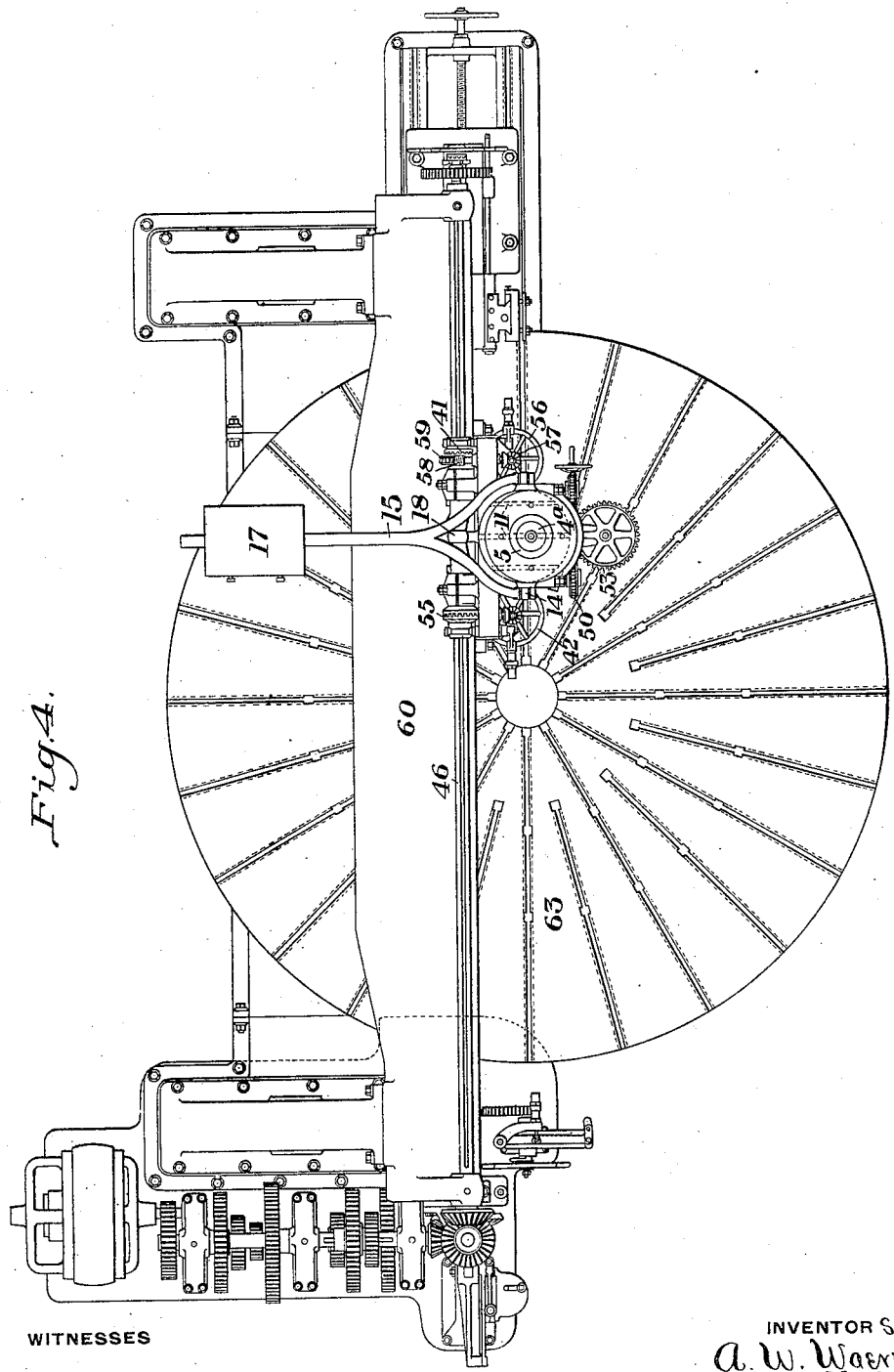
WITNESSES
INVENTORS
A. W. Waern,
C. von Philp,

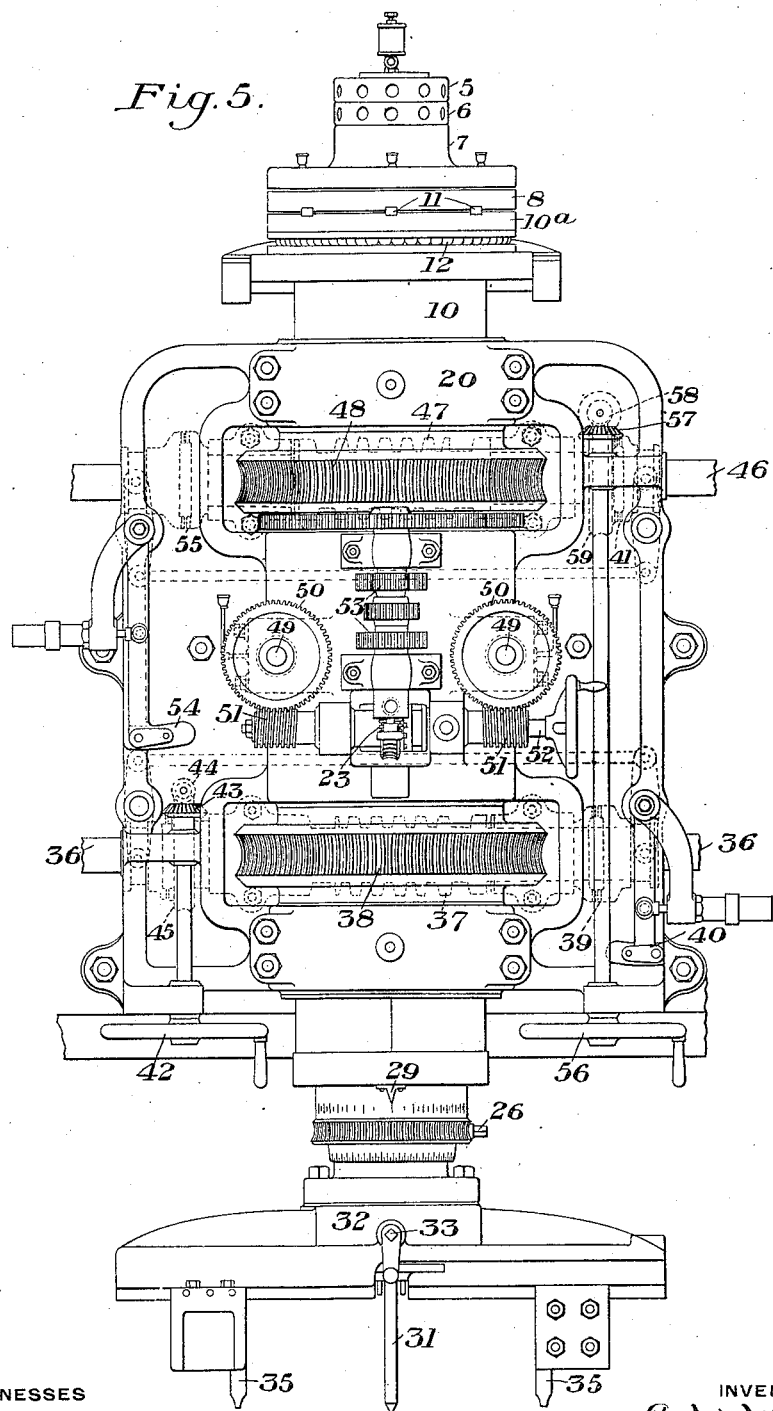

A. W. WAERN & C. VON PHILP.
MACHINE FOR CUTTING ROUND AND OVAL HOLES.
APPLICATION FILED SEPT. 9, 1908.
934,863.
Patented Sept. 21, 1909.
5 SHEETS—SHEET 5.
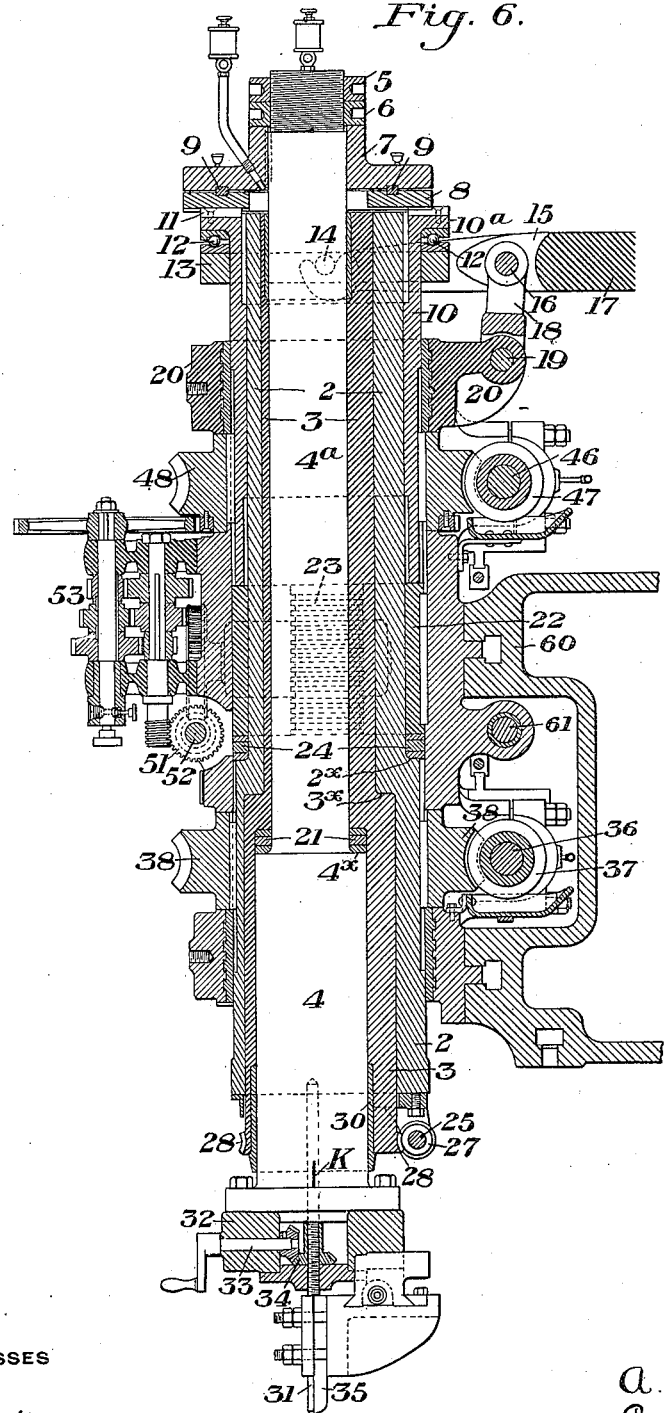
WITNESSES
R A Balderson
W W Swartz
INVENTORS
A. W. Waern
C. von Philp,
by Bakewell, Byrnes & Parmelee,
their attys.

UNITED STATES PATENT OFFICE.

ADOLPH W. WAERN, OF BETHLEHEM, PENNSYLVANIA, AND CASIMIR VON PHILP, OF NEW YORK, N. Y., ASSIGNORS TO BETHLEHEM STEEL COMPANY, OF SOUTH BETHLEHEM, PENNSYLVANIA, A CORPORATION OF PENNSYLVANIA.

MACHINE FOR CUTTING ROUND AND OVAL HOLES.

934,863.

Specification of Letters Patent.   Patented Sept. 21, 1909.

Application filed September 9, 1908.   Serial No. 452,335.

*To all whom it may concern:*

Be it known that we, ADOLPH W. WAERN, of Bethlehem, in the county of Northampton and State of Pennsylvania, and CASIMIR VON PHILP, of New York, in the county of New York and State of New York, have invented a new and useful Improvement in Machines for Cutting Round and Oval Holes, of which the following is a full, clear, and exact description, reference being had to the accompanying drawings, forming part of this specification, in which—

Figure 1:
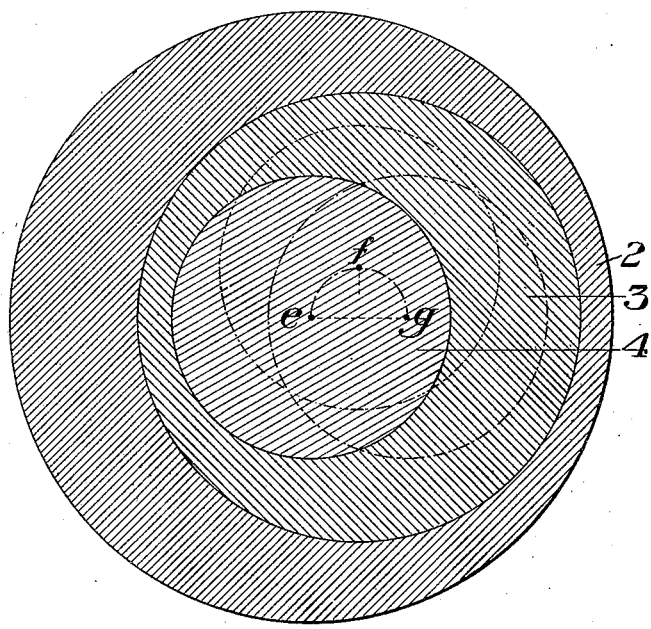
Figure 2:
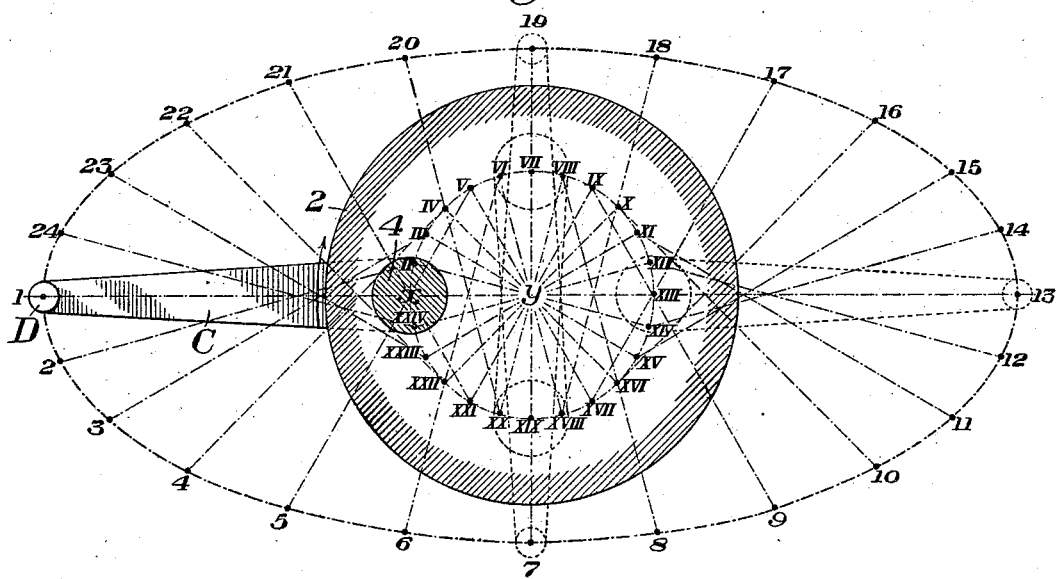

Figure 1 is a cross section of three nested spindles which we employ; Fig. 2 is a diagram illustrating the action of setting and cutting an oval; Fig. 3 is a front elevation partly in section of the entire machine; Fig. 4 is a plan view of the same; Fig. 5 is a front elevation of the cutting head on a larger scale, and Fig. 6 is a vertical section of Fig. 5.

Our invention relates to the cutting of circular or oval shaped holes in metal plates, such as steel boiler plates.

The object of the invention is to provide a machine by which ovals having major axes of different lengths may be cut, and also to provide for cutting an ellipse in any desired direction on the plate without shifting the plate operated upon.

Referring to Fig. 1, 2 is an outside eccentric hollow spindle, 3 an intermediate eccentric setting spindle which is also bored out to receive an inner solid spindle 4. The spindles are so arranged that the intermediate spindle may be turned to adjust the eccentricity, and the spindles 2 and 3 are then so connected to each other that spindle 4 may be rotated in a clockwise direction, while spindles 2 and 3 are simultaneously rotated in a counter-clockwise direction. If, now, the tool is secured to a tool post on the interior spindle 4, it will move in an elliptical path, the size of which will depend upon the eccentricity between the centers of spindles 2 and 4. If the spindle 2 is set so that its axis coincides with that of spindle 4, then a circular hole will be cut, the eccentricity being zero.

Referring now to the diagram of Fig. 2, $x$ indicates the center of spindle 4 and $y$ the center of spindle 2. C represents an arm projecting from spindle 4 and having a cutting tool indicated at D. When the cutting is to commence the line $y$—$x$—D is a straight line, and this line will be one-half the major axis of the ellipse to be cut. Spindle 3 is omitted from this diagram, as it is merely a setting spindle which after adjustment is secured to spindle 2. Now, if spindles 2 and 4 are started in rotation at the same moment, both revolving at the same speed and in opposite directions, when the spindle 2 has turned so that the center $x$ of spindle 4 is at point II, the spindle 4 will have turned through the same angle in the opposite direction, and consequently the tool D will be located at point 2 in its elliptical path. When spindle 2 has turned 90 degrees the center of spindle 4 is at point VII and spindle 4 having turned 90 degrees, the tool will be located at point 7 on the transverse axis of the ellipse. The diagram indicates the successive positions, these positions being corresponding in number with Arabic and Roman numerals. Hence, in accordance with this arrangement the distance $y$—D is equal to one-half the greater axis of the ellipse, and is twice the eccentricity longer than one-half the conjugate axis of the ellipse, or the difference in length between the major axis and conjugate axis is equal to four times the eccentricity. When the spindles have made one full revolution a true ellipse will have been described by the tool. The tool is movable on its post or arm and can be fixed at any point to suit the size of the ellipse to be cut.

As shown in Fig. 1, when the setting spindle 3 is adjusted in a rotary direction, the center of the inner spindle 4 travels in an arc $e\,f\,g$. When the center of the inside spindle is at the point $g$ the maximum eccentricity is obtained. In the present case this would be 1½ inches, and point $f$ indicates an eccentricity of 1 inch, corresponding to 4 inches difference in length between the axes of the ellipse to be cut. The line connecting the centers of the outer spindle 2 and the inner spindle 4 represents the direction of the major axis of the ellipse to be cut; and as all the spindles can be set separately, a setting can be made which will give any desired direction to the major axis of the ellipse. Therefore, in setting the tool the first step is to set the center of spindle 4 in the center of spindle 2 and the whole system in the center of the hole to be cut. The next step is to set the spindle 2 relative to 4 by turning spindle 3 to give the desired eccentricity. The third step is to turn the three spindles until the major axis of the ellipse is at the desired angle relative to the plate to be cut.

Referring now to Figs. 5 and 6, the central solid spindle 4 has an upper portion $4^a$ of reduced diameter which extends above the spindles 2 and 3, and has a screw threaded upper end provided with adjusting and locking nuts 5 and 6. These nuts rest upon a flanged collar 7, which in turn rests loosely upon and is connected with a loose disk 8 by transverse keys 9. The disk 8 in turn rests loosely upon and has key connection with the upper flange of a sleeve 10. The keys 11 between 8 and 10 are at right angles to the keys 9, thus allowing universal motion of the spindle 4. The upper flange $10^a$ of sleeve 10 rests upon ball bearings 12 carried upon a supporting ring 13 having opposite outwardly projecting pins 14 carried in the ends of a forked yoke 15 pivoted at 16 and provided with a counterweight, indicated at 17. The link support 18 for the pivot 16 is pivoted at 19 to the frame of the cutting head, having the inclosing bearing 20 for the sleeve 10. The sleeve 10 surrounds the spindle 2 in its upper reduced diameter portion, and each of the spindles 2, 3 and 4 is shouldered, as indicated at $2^x$, $3^x$ and $4^x$, so that the spindles 2 and 3 hang upon the spindle 4, which in turn is suspended from its upper end. Wearing rings 21 are preferably provided between the spindles 3 and 4, as there is a turning of one relative to the other during the operation of the machine. At the lower end of the sleeve 10 is a feed sleeve 22 carrying opposite racks 23 by which the sleeve may be fed upwardly or downwardly, thus feeding the spindle system. The feed sleeve 22 bears at its lower end through wear collars 24 upon the outer shoulder of spindle 2. The spindle 3 projects below the lower end of spindle 2, and spindle 4 projects below the lower end of spindle 3. In order to adjust spindle 3, we support upon the lower end of spindle 2 a worm shaft 25 having a squared outer end 26 to receive a hand wrench. This shaft 25 has a worm 27 engaging a worm wheel 28 on spindle 3. The projecting end of spindle 3 above the worm wheel is provided with a scale, shown in Fig. 5, and when the pointer 29 on spindle 2 is at zero there will be no eccentricity and a circle will be cut. The lower end of spindle 3 is internally provided with a bushing 30, which is also graduated below the worm wheel, this coacting with an indicator line on spindle 4, as shown at K in Fig. 6. There are two graduations on this bushing.

The pointer 31 is centrally located on a tool head 32 secured to the lower end of spindle 4, this head having a hand shaft 33 with bevel gear connections 34 for vertical adjustment. The cutting tool or tools are indicated at 35 and may be adjusted on the tool head by a slide connection therewith. The outer spindle 2 receives its rotary motion from a shaft 36 by the worm 37 thereon engaging a worm wheel 38. The worm 37 is loose on the shaft 36 and has clutch connection therewith through the power clutch 39 actuated by the clutch lever 40. The clutch lever 40 is also connected to a clutch 41 for hand power. When the lever is in the central position both clutches are disengaged, and throwing in one clutch throws out the other. When the clutch for hand power is engaged the worm 37 can be turned by the hand wheel 42 through the miter gears 43, worm 44 and worm wheel 45. The spindle 4 receives its motion from shaft 46, worm 47, worm wheel 48, which is keyed to the sleeve 10, disk 8, through the keys to the flanged disk 7 keyed to the spindle. The disks and keys take up the eccentric motion of the spindle 4 and by this arrangement the spindle 4, when running by power, will turn with exactly the same speed as spindle 2 and in the opposite direction. The worm wheel 38 is similar to worm wheel 48, and worm 37 is similar to worm 47. The racks 23 on the feed sleeve 22 are engaged by wheels on the shaft 49 having worm wheels 50 engaged by worms 51 on the hand shaft 52. 53 is a change gear device by which the feed may be varied. The setting of spindle 4 by hand is the same as the setting of spindle 2 by hand, this being accomplished through the hand lever 54, clutch 55, hand wheel 56, miter gears 57, worm 58 and worm wheel 59, arranged similarly to the parts for setting spindle 2. When the spindle 2 is turned by hand or by power, spindle 3 must follow it, on account of being locked to spindle 2 by the worm 27 and worm wheel 28.

As shown in Figs. 3 and 4, the entire cutting head is carried upon an overhead framework 60 and may be moved along said framework in the manner of a planer head. This is accomplished through a screw 61 having ordinary worm and clutch connection with the power shaft 36 extending from end to end of the frame. The table 63 for supporting the boiler plate is shown as a rotary table, which may be turned in the ordinary manner and on which the plate may be secured and adjusted in any desirable manner.

*Method of setting spindles.*—By means of the worm 27 and worm wheel 28 the zero mark on setting spindle 3 is set at the pointer attached to the outside spindle 2. By this operation the inside spindle 4 is placed concentric with the outside spindle 2, and hence the pointer 31 in the center of the inside spindle is located in the center of the cutting head. By revolving the table and sliding the cutting head on a cross rail, the pointer is then located at the center of the hole to be cut. When the center of the hole and the cutting head are in the proper position the eccentricity is set to the required amount by turning the spindle 3 through worm 27 and worm wheel 28 until the desired graduation on the spindle 3 reaches the pointer on the outer spindle 2. The cutting tool is now set at the end of the major axis of the hole to be cut by turning the inside spindle 4, and the outside spindle 2 together with the setting spindle 3 are set to locate the indicator line K for the point of the setting tool at the same graduation on the bushing 30 as the graduation on the upper scale of spindle 3. Thus if 3½ inches is desired for the eccentricity, both scales are set at 3½ graduation. Both spindles—the inside spindle 4 and the outside spindle 2—together with the setting spindle 3 can be set by hand or power. Preliminary rough setting can be made by power from the shaft of the machine and final adjustment made by hand. After the setting operation the power clutches are thrown in and the cutting tools are moved in the desired path, downward feed being imparted through the feed sleeve by hand.

The advantages of our invention will be apparent to those skilled in the art. The use of three spindles enables us to give any desired degree of eccentricity and vary the axes of the ellipse as desired. The parts may also be set so that the major axis of the ellipse may extend in any desired direction. This is an important feature, as it avoids manipulation of the plate on its table. In practice, the machine is found to work accurately and smoothly, giving any desired diameter of circle, or any desired size of ellipse extending in any direction for which the apparatus is set. The setting is easily and quickly accomplished through the scales, and while the machine necessarily has a considerable number of parts, yet its operation is easily understood and carried out.

Many changes may be made in the form and arrangement of the three spindles and their mountings and driving connections, together with the means for adjustment, etc., without departing from our invention.

We claim:

1. In a machine for cutting ovals, three nested eccentric spindles, connections for driving the outer spindles in one direction and the inner spindle in the opposite direction, and a tool head upon one of the driven spindles, substantially as described.

2. In a machine for cutting ovals, three nested eccentric spindles, mechanism for turning the intermediate eccentric spindle to adjust the eccentricity, mechanism for driving the outer spindles in one direction and the inner spindle in the opposite direction, and a tool head upon one of the driven spindles.

3. In a machine for cutting ovals, three nested eccentric spindles, two of which are driven, one of the driven spindles being a cutting spindle, connections for adjusting the said spindles relative to each other to give any desired direction to the major axis of the ellipse; and a tool head upon the cutting spindle, substantially as described.

4. In a machine for cutting ovals, three nested eccentric spindles projecting to different distances at their ends, the center and outer spindles being driven, a tool holder secured to the central spindle, and means for adjusting the intermediate spindle to regulate the eccentricity; substantially as described.

5. In a machine for cutting ovals, three nested eccentric spindles with their ends projecting beyond one another, connections for adjusting the intermediate spindle, locking means between it and the outer spindle, and connections for rotatably driving the innermost spindle in one direction and the outer two spindles in the opposite direction; substantially as described.

6. In a machine for cutting ovals, three nested eccentric spindles with their ends projecting beyond one another, connections for adjusting the intermediate spindle, locking means between it and the outer spindle, and connections for rotatably driving the innermost spindle in one direction and the outer two spindles in the opposite direction at the same rate of speed; substantially as described.

7. In a machine for cutting ovals, three nested eccentric spindles, connections for rotatably driving the outer two spindles in one direction and the inner spindle in the opposite direction, a cutter carried by the innermost spindle, and mechanism for feeding the cutter toward the work during rotation of the spindles; substantially as described.

8. In a machine for cutting ovals, three nested eccentric spindles, a cutting tool secured to the inner projecting spindle, mechanism for adjustably turning the intermediate spindle and locking it to the outer spindle, means for rotatably driving the outer two spindles in one direction and the inner spindle in the opposite direction, and means for feeding the tool to its work during rotation; substantially as described.

9. In a machine for cutting ovals, three nested eccentric spindles, two of which are driven, one of the driven spindles being a cutting spindle, mechanism for adjusting the intermediate spindle to change the eccentricity, adjusting mechanism arranged to set the major axis of the ellipse to be cut at any desired angle; and a tool head carried by the cutting spindle, substantially as described.

10. In a machine for cutting ovals, three nested eccentric spindles having their ends projecting beyond one another, coacting scale and pointer mechanism thereon, two of the spindles being driven and the other spindle being an adjusting spindle, and a tool head carried by one of the driven spindles.

11. A machine for cutting ovals having three eccentrically nested spindles, two of which are driven, one of the driven spindles being a cutting spindle, and a tool head carried by the cutting spindle, substantially as described.

12. A machine for cutting ovals having a series of eccentrically nested spindles, two of which are driven, one of the driven spindles being a cutting spindle, and a tool head carried by the cutting spindle, substantially as described.

13. A machine for cutting ovals having a series of eccentrically nested spindles, means for rotatably driving two of the spindles, one of the driven spindles being a cutting spindle, and a tool head carried by the cutting spindle, substantially as described.

14. A machine for cutting ovals having a series of eccentrically nested spindles, means for rotatably driving two of the spindles simultaneously in opposite directions, one of the driven spindles being a cutting spindle, and a tool head carried by the cutting spindle, substantially as described.

15. A machine for cutting ovals having a series of three eccentrically nested spindles, one of which is a rotatably driven cutting spindle, another a rotatably driven spindle carrying the cutting spindle eccentric thereto, the third spindle mounted for rotatable shifting and coöperating with the two first-mentioned spindles for varying the eccentricity of the cutting spindle, and a tool head carried by the cutting spindle, substantially as described.

16. A machine for cutting ovals having three eccentrically nested spindles, two of which are simultaneously driven in opposite directions, one of the driven spindles being a cutting spindle and the third spindle capable of being rotatably shifted for adjusting the eccentricity of the cutting spindle and also capable of being fixed to one of the driven spindles during the operation of the machine, and a tool head carried by the cutting spindle, substantially as described.

17. A machine for cutting ovals having three eccentrically nested spindles, two of which are simultaneously driven in opposite directions, one of the driven spindles being a cutting spindle, the third spindle capable of being rotatably shifted for adjusting the eccentricity of the cutting spindle, means for locking the adjusting spindle with the other driven spindle during the operation of the machine, and a tool head carried by the cutting spindle, substantially as described.

18. A machine for cutting ovals having three eccentrically nested spindles, two of which are simultaneously driven in opposite directions, one of the driven spindles being a cutting spindle, the third spindle capable of being rotatably shifted for adjusting the eccentricity of the cutting spindle, means extending between the adjusting spindle and the other driven spindle for rotatably shifting the adjusting spindle and for locking the adjusting spindle with said other driven spindle during the operation of the machine, and a tool head carried by the cutting spindle, substantially as described.

In testimony whereof, I have hereunto set my hand.

A. W. WAERN.

Witnesses:
 CHAS. E. LEHR,
 C. R. DEIBERT.

In testimony whereof, I have hereunto set my hand.

CASIMIR VON PHILP.

Witnesses:
 E. VAN ZANDT,
 BERTIL VON PHILP.